C. B. REYNOLDS.
AIRLESS TIRE CORE.
APPLICATION FILED JUNE 6, 1916.

1,223,204. Patented Apr. 17, 1917.

Inventor
C. B. Reynolds.

Witnesses

By
Attorney

UNITED STATES PATENT OFFICE.

CHARLES B. REYNOLDS, OF SAWTELLE, CALIFORNIA.

AIRLESS TIRE-CORE.

1,223,204.  Specification of Letters Patent.  Patented Apr. 17, 1917.

Application filed June 6, 1916. Serial No. 101,937.

*To all whom it may concern:*

Be it known that I, CHARLES B. REYNOLDS, a citizen of the United States, residing at Sawtelle, in the county of Los Angeles and State of California, have invented certain new and useful Improvements in Airless Tire-Cores; and I do hereby declare the following to be a full, clear, and exact description of the invention, such as will enable others skilled in the art to which it appertains to make and use the same.

This invention relates to a tire and has for its primary object to provide a resilient filled, which will obviate the necessity of using the ordinary pneumatic inner tube, whereby all punctures and blow outs are obviated.

An object of this invention is to provide woven linen and woolen fabric cemented together in the formation of a tire or shoe, having a vegetable wax tread embedded therein to provide resiliency to the shoe or tire.

Another object of this invention is to provide the filler constructed from compositions of materials bound together by tape and fabric belting in circular formation, being protected by a steel protector to provide a filler which will have a cushioning effect to take up all shock and jars as that of a pneumatic tire.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1:
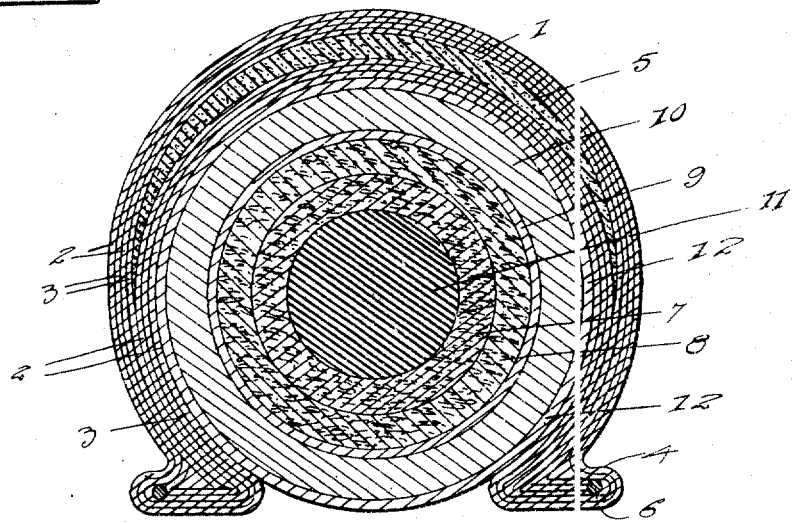
Figure 2:
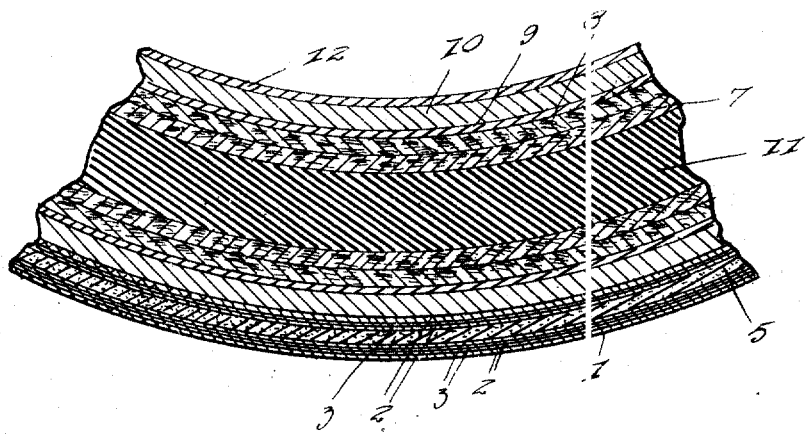

Figure 1 is a transverse sectional view of an airless tire core, constructed in accordance with my invention, and Fig. 2 is a fragmentary longitudinal sectional view of the same.

Referring in detail to the drawing, the numeral 1 indicates a tire or shoe, constructed of a plurality of layers of woven linen and woolen fabric, 2 and 3, cemented or otherwise secured together, which are so arranged to form beads whereby the tire or shoe may be clamped to the rim of a wheel. A vegetable wax tread 5 is embedded in the shoe or tire 1 between the layers of linen and woolen fabric in the tread portions thereof to add resiliency thereto. Suitable metallic reinforcing rods or members 6 are embedded in the beads 4 to retain the shoe or tire in its proper shape, also stiffening the beads 4 throughout their lengths.

The filler which is positioned within the tire or shoe 1 above described, consists of comminuted cork mixed with cement and compressed in layers 7 and 8 around a core or filler which is later removed. The layers of comminuted cork are wrapped with tape 9 in spiral formation, which is in turn wrapped with fabric belting 10 in spiral formation and wound in the opposite direction from the tape 9. The tape and fabric belting entirely covers and protects the layers of comminuted cork and holds them in proper formation. The filler or core which the layers of cork are molded upon is removed, leaving a space which is filled with a sponge rubber core 11, which supports the layers of cork and keeps them from collapsing, and which will render resiliency to the cork.

The process of forming the airless core afore described is as follows: The layers of cork are first made in single lengths and placed or molded about a mandrel or filler in cylindrical formation, and the mandrel or filler is then removed from one end thereof and the sponge rubber core formed in a single length is inserted in the space provided by the mandrel or filler. The tape and fabric belting is then wound on the cork in the afore described manner and the airless core is then placed within a shoe or tire with the ends thereof abutting each other.

A steel protector 12 consisting of a steel ribbon is spirally wound about the spirally wrapped fabric belting 10 to prevent the belting from becoming chafed or injured by the friction caused by the tire or shoe 1 and which will add resiliency to the filler. Adhesive material is applied to the steel protector for adhering the same to the tire or shoe 1 when the filler is placed therein.

From the foregoing description taken in connection with the accompanying drawing, it will be noted that a cushion tire has been provided which may be readily applied to the wheels of an automobile now in use and will have all of the resiliency now obtained from pneumatic tires, obviating the expense caused by punctures and blow outs of the pneumatic tires.

While I have shown and described the preferred embodiment of my invention, it will be understood that minor changes in construction, combination and arrangement of parts may be made without departing from the spirit and scope of the invention as claimed.

Having thus described my invention, what I claim is:—

In a device of the character set forth comprising a filler consisting of layers of comminuted cork cemented together, a core within the layers of cork, tape spirally wound around the outer surface of the layers of cork, fabric belting spirally wound around the tape in an opposite direction, a metallic ribbon spirally wound around the fabric belting, and a shoe surrounding the filler.

In testimony whereof I affix my signature in presence of two witnesses.

CHARLES B. REYNOLDS.

Witnesses:
WALLACE F. LEDERER,
OSCAR N. BEASLEY.